(12) United States Patent
Nakamura

(10) Patent No.: US 7,605,518 B2
(45) Date of Patent: Oct. 20, 2009

(54) ROTARY ELECTRIC MACHINE FOR VEHICLES

(75) Inventor: Shigenobu Nakamura, Anjo (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 11/240,566

(22) Filed: Oct. 3, 2005

(65) Prior Publication Data

US 2007/0228866 A1    Oct. 4, 2007

(30) Foreign Application Priority Data

Oct. 1, 2004    (JP) .............................. 2004-290659

(51) Int. Cl.
*H02K 1/22* (2006.01)
(52) U.S. Cl. .................. 310/263; 310/156.72
(58) Field of Classification Search ................ 310/263, 310/156.08, 156.66–156.72, 45, 43
See application file for complete search history.

(56) References Cited

U.S. PATENT DOCUMENTS

| | | | | |
|---|---|---|---|---|
| 4,115,716 A | * | 9/1978 | Ogasawala et al. | .......... 310/153 |
| 4,126,933 A | * | 11/1978 | Anderson et al. | ............. 29/598 |
| 4,228,377 A | * | 10/1980 | Kreuzer | ...................... 310/263 |
| 4,617,485 A | * | 10/1986 | Nakamura et al. | ............. 310/65 |
| 4,954,736 A | * | 9/1990 | Kawamoto et al. | ..... 310/156.21 |
| 5,483,116 A | | 1/1996 | Kusase et al. | |
| 5,536,987 A | * | 7/1996 | Hayashi et al. | ............. 310/263 |
| 5,793,144 A | | 8/1998 | Kusase et al. | |
| 5,907,209 A | * | 5/1999 | Ishida | ........................ 310/263 |
| 5,925,964 A | | 7/1999 | Kusase et al. | |
| 6,002,194 A | | 12/1999 | Asao | |
| 6,150,746 A | * | 11/2000 | Lechner | ...................... 310/181 |
| 6,201,335 B1 | * | 3/2001 | Higashino et al. | ........... 310/263 |
| 6,369,485 B1 | * | 4/2002 | Oohashi et al. | ............. 310/263 |
| 6,486,585 B1 | | 11/2002 | Badey et al. | |

(Continued)

FOREIGN PATENT DOCUMENTS

EP    1 237 256 A2    9/2002

(Continued)

OTHER PUBLICATIONS

Luc Jouanjan; "Electric Motor or Generator"; Research Disclosure; Mason Publications, Hampshire, GB; vol. 428, No. 11; Dec. 1999.

(Continued)

*Primary Examiner*—Tran N Nguyen
(74) *Attorney, Agent, or Firm*—Oliff & Berridge, PLC

(57) ABSTRACT

An on-vehicle rotary electric machine, such as AC generator, is provided. The machine comprises a rotary shaft, a pole core, plural magnetic poles, plural permanent magnets, and plural holding members. The magnetic poles are located at intervals in a circumferential direction and passing magnetic flux between two mutually-adjacent of the magnetic poles. Each permanent magnet intervenes between the two magnetic poles and is magnetized to reduce leakage of the magnetic flux to be passed. Each holding member holds each permanent magnet between the two magnetic poles. Each holding member is secured on the two magnetic poles and has a first plate portion enclosing a radially outer surface of each permanent magnet and two second plate portions enclosing side surfaces of each permanent magnet. The two second plate portions are rigidly coupled to the first plate portion and are lower in rigidity than the first plate portion.

9 Claims, 9 Drawing Sheets

U.S. PATENT DOCUMENTS

| | | |
|---|---|---|
| 6,657,328 B2 * | 12/2003 | Shiga et al. .................... 310/26 |
| 6,853,112 B2 * | 2/2005 | Nakamura et al. .......... 310/263 |
| 7,064,467 B2 * | 6/2006 | Yokota et al. ............... 310/215 |
| 2002/0117934 A1 | 8/2002 | Kanazawa et al. |
| 2002/0117935 A1 * | 8/2002 | Kanazawa et al. .......... 310/263 |
| 2004/0032183 A1 | 2/2004 | Nakamura et al. |

FOREIGN PATENT DOCUMENTS

| | | |
|---|---|---|
| JP | A-62-31352 | 2/1987 |
| JP | A-07-123664 | 5/1995 |
| JP | A-9-74727 | 3/1997 |
| JP | A-9-191590 | 7/1997 |
| JP | 10066286 A * | 3/1998 |
| JP | A-10-066286 | 3/1998 |
| JP | A-11-356019 | 12/1999 |
| JP | A-2002-262530 | 9/2002 |
| JP | A-2003-324873 | 11/2003 |
| JP | A-2003-339141 | 11/2003 |

OTHER PUBLICATIONS

Notification of Reasons for Rejection for Japanese Patent Application No. 2004-290659 with English translation, Jun. 23, 2009, pp. 1-2.

* cited by examiner

ROTARY ELECTRIC MACHINE FOR VEHICLES

CROSS REFERENCE TO RELATED APPLICATION

The present application relates to and incorporates by reference Japanese Patent application No. 2004-290659 filed on Oct. 1, 2004.

BACKGROUND OF THE INVENTION

1. Field of the Invention

The present invention relates to an on-vehicle rotary electric machine, and, in particular, to an alternating current (AC) generator mounted on vehicles.

2. Description of the Related Art

In general, a vehicle is provided with an AC generator to power various components such as electric accessories and batteries which are mounted on the vehicle.

There are many types of AC generators including an AC generator provided with a Lundell type of rotor. That is, this type of AC generator is provided with Lundell type of unguiform magnetic poles forming a rotor and a stator arranged to face the rotor. In this AC generator, in order that magnetic flux may be transmitted surely between the stator and the magnetic poles (i.e., the rotor), there has been known the technique of placing a permanent magnet between mutually faced sides provided by two adjacent unguiform magnetic poles. The permanent magnet operates to prevent the magnetic flux from being leaked between the unguiform magnetic poles. As to this structure, it is significant to prevent each permanent magnet from dropping out outwardly in the radial direction of the generator due to the centurial force generated when the generator is in operation, whereby preventing the drop results in prevention of the breakage of the permanent magnets in the generator. Practically, this kind of structure has been proposed by the references such as Japanese Patent Laid-open publications. No. 7-123664, 2003-339141, and 2002-262530.

Of these, the first reference No. 7-123664 provides a structure for holding permanent magnets by resin-made holding members. The second reference No. 2003-339141 provides a structure in which magnet holding members each formed into a plate-like member made of non-magnetic material are used to enclose each permanent magnet in the axial direction of the generator.

Further, the third reference No. 2002-262530 provides a more complicated structure which uses magnet holding members and auxiliary magnetic-pole members. To be specific, each magnetic holding member, made of non-magnetic metal, is placed to enclose the outer and inner circumferential surfaces and both axial side surfaces of each permanent magnet. Each auxiliary magnetic-pole member, made of magnetic metal, is placed to cover both side surfaces of the each permanent magnet locating in the circumferential direction of the generator (i.e., the circumferential-side surfaces each face a circumferential-side surface of an adjacent unguiform magnetic pole in the circumferential direction). Additionally, in the third reference, a technique of welding the magnet holding member with the auxiliary magnetic-pole member into one unit is also taught.

However, it is pointed out that the conventional holding structures according to the foregoing various references are insufficient in the following points.

The holding structure provided by the first reference No. 7-123664 has a drawback that the holding members are short of strength, because the members are made of resin. Thus it is noted that the holding members may give rise to their breakage such as cracks.

In this regard, in the second reference No. 2003-339141, each permanent magnet is enclosed by the plate-like member made of non-magnetic metal, so that the strength is increased. This makes it possible to remove or alleviate a worry that the holding member itself may be broken. In this second technique, however, it is necessary to mutually joint the enclosing ends of the plate-like members, which raises labor lo hours in fabrication. Moreover, because each permanent magnet is enclosed in the axial direction of the generator, an amount of metal material used for producing the magnet holding member increases. Hence the magnet holding member proposed by the second reference will result in a rise in manufacturing cost.

The holding structure provided by the third reference 3 requires that each magnet holding member made of non-magnetic metal be welded to both auxiliary magnetic-pole members made of magnetic metal, thus raising manufacturing cost. In addition, the auxiliary magnetic-pole members are made of magnetic metal, as described above, so that the members may get rusty. Auxiliary magnetic-pole members which have been rusted badly may result in breakages thereof, with the result that permanent magnets may drop out.

SUMMARY OF THE INVENTION

The present invention has been completed with the above view in mind and has an object to provide an on-vehicle rotary electric machine with unguiform magnetic poles between which a permanent magnet is held by a holding member without raising manufacturing cost and with less fear of breakage.

To achieve the above object, as one mode, the present invention provides an on-vehicle rotary electric machine, comprising: a rotary shaft driven to rotate, the shaft having a longitudinal direction defining an axial direction, radii debug a radial direction, and a circumference defining a circumferential direction; a pole core secured on the rotary shaft; a plurality of magnetic poles formed as parts of the pole core, the magnetic poles being located at intervals in the circumferential direction and passing magnetic flux between two mutually-adjacent of the magnetic poles; a plurality of permanent magnets each intervening between the two mutually-adjacent magnetic poles, each magnet being magnetized to reduce leakage of the magnetic flux to be passed; and a plurality of holding members each holding each permanent magnet between two mutually-adjacent magnetic poles, each holding member being secured on the two mutually-adjacent magnetic poles and having a first plate portion enclosing a radially outer surface of the permanent magnet and two second plate portions enclosing side surfaces of the permanent magnet, the side surfaces each facing the circumferential direction, and the two second plate portions being rigidly coupled to the first plate portion and being lower in rigidity than the first plate portion.

Accordingly, the holding member can be formed into a substantially horseshoe shape or a substantially C-shape, thus reducing an amount of material required for producing the holding member. Further, the two second plate portions are lower in rigidity (in other words, higher in elasticity) than the first plate. As a result, the second plate portions are easier to be fabricated into the substantial horseshoe shape or the substantial C-shape. Additionally, the second plate portions provide higher resistance against the centrifugal force, vibration and others, whereby the damage or breakage of the holding member can be avoided or suppressed more surely than the conventional, with no increase in manufacturing cost or suppressed manufacturing cost.

As another mode, the present invention provides a method of manufacturing a rotary electric machine, comprising steps of: forming a layer on a magnetic field coil to be loaded to a pole core included in a rotor by impregnating a first thermosetting resin to the magnetic field coil; filling a gap with a second thermosetting resin, the gap formed between an outer surface of a holding member supporting a permanent magnet and a surface of each of mutually-adjacent unguiform magnetic poles, the permanent magnet being located between the mutually-adjacent unguiform magnetic poles; and heating both the first and second thermosetting resins at the same time.

Hence, compared to coating a thermosetting resin (prepolymer) to the magnetic field coil after the assembly of the rotor, the heating process can be simplified, increasing efficiency of the whole fabricating processes for the machine.

DETAILED DESCRIPTION OF PREFERRED EMBODIMENTS

Figure 1:
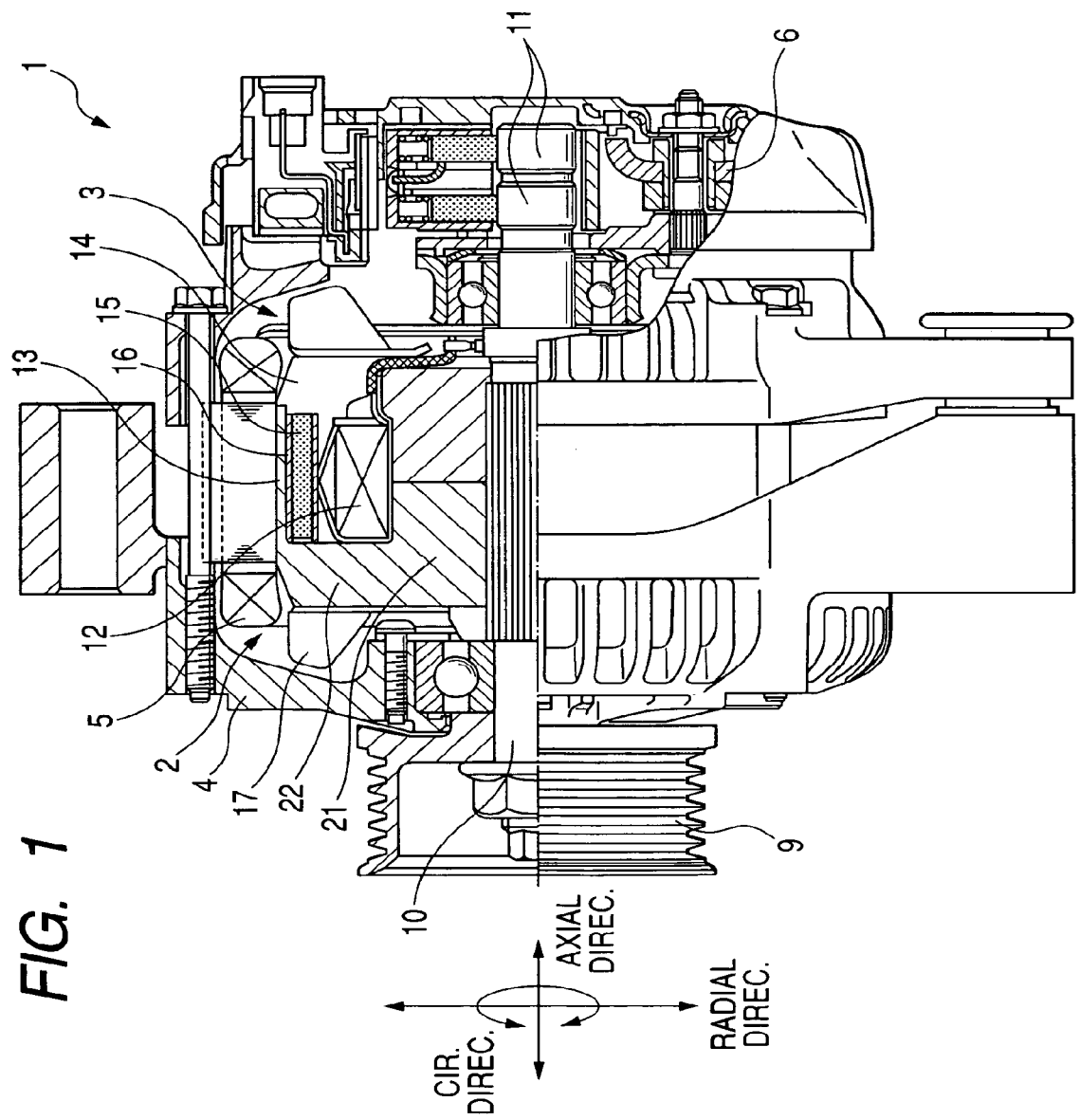
FIG. 1 is a partial cross sectional view showing the essential components of an on-vehicle generator according to an embodiment of the present invention.

Embodiments of the present invention will now be described with reference to the accompanying drawings.

Referring to FIGS. 1-7, an embodiment of an on-vehicle rotary electric machine according to the present invention will now be detained. In the present embodiment, the on-vehicle rotary electric machine is reduced into practice as an alternating current (AC) generator (hereinafter, referred to as a "generator") that is driven to rotate by, for example, an on-vehicle internal engine (not shown in the drawings) for powering on-vehicle components such as a battery (not shown in the drawings).

FIG. 1 shows the overall structure of a generator 1 according to the present embodiment. As shown therein, the generator 1 is equipped with a stator 2 functioning as an armature, a rotor 3 functioning as magnetic filed poles, a housing 4 enclosing the stator 2 and rotor 3, and a rectifier 6 converting AC power induced across armature coils 5 to DC power.

Of these, the rotor 3 is equipped with a substantially cylindrical rotary shaft 10, a magnetic field coil 12, plural unguiform magnetic poles 13, a pole core 14, plural permanent magnets 15, magnet holding members 16, and a cooling fan 17.

The directions used in the explanation of the embodiment will be defined such that directions along the longitudinal form of the rotary shaft 10 are "axial directions," directions along the radii of the rotary shaft 10 are "radial directions," and directions in parallel to the circumferential directions of the rotary shaft 10 are "circumferential directions."

Figure 2:
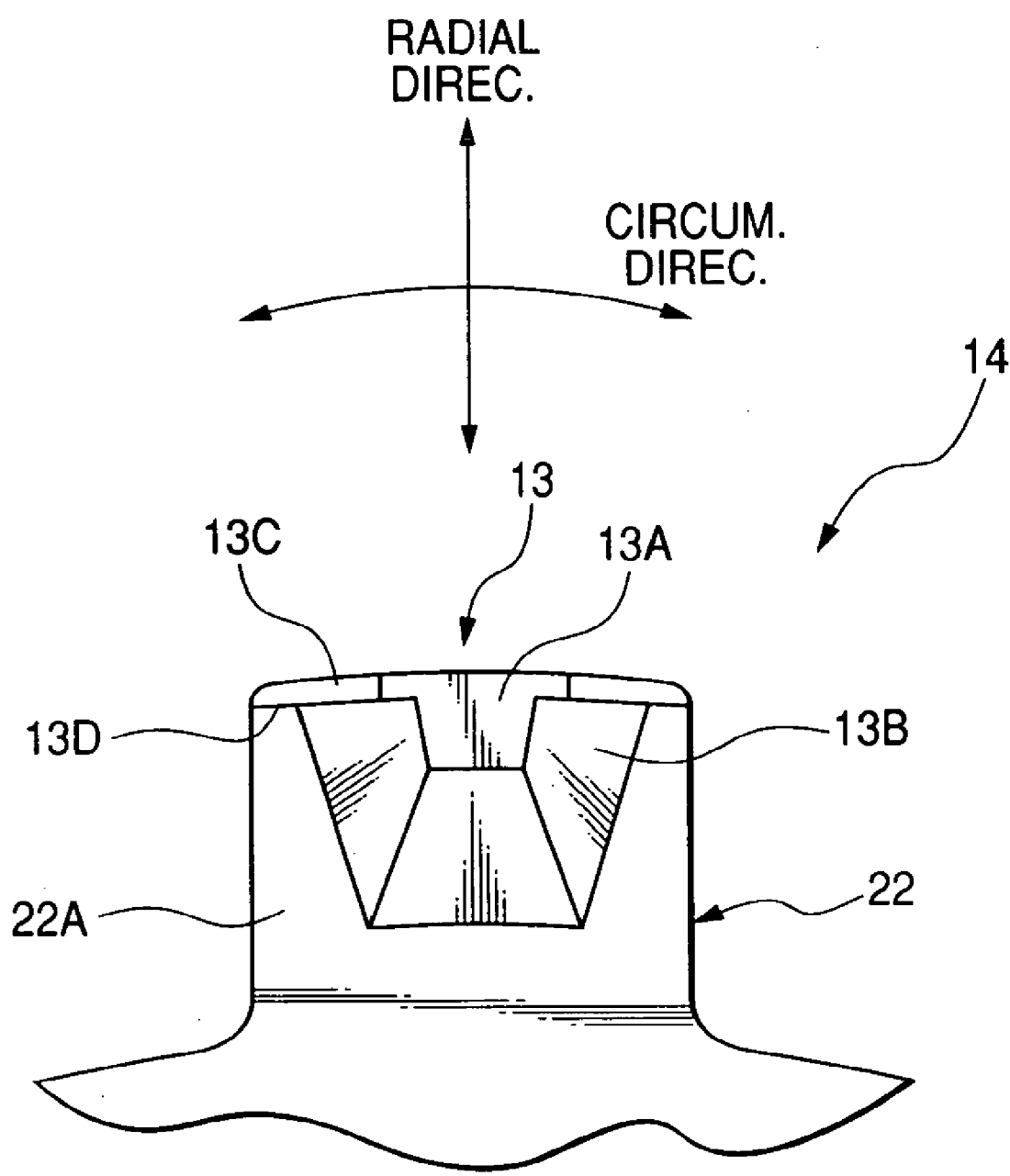
FIG. 2 is a partial frontal view of a pole core viewed along an axial direction of the generator, the pole core including unguiform magnetic poles.

The rotary shaft is driven to rotate by the internal engine via a pulley 9 and a belt (not shown). The magnetic filed coil 12 is wound to be energized by field current supplied via slip rings 11 from the battery. The plural unguiform magnetic poles 13 are oriented in the anal directions, but alternatively in the mutually opposite directions, whilst the magnetic poles 13 are aligned at intervals in the circumferential directions and in charge of passing magnetic flux caused by the filed current, As shown in FIG. 2, each unguiform magnetic pole 13 has a main pole body 13A protruding in the axial direction from an axial inner surface 22A of each disk-like portion 22. This main pole body 13A has two circumferential-side surfaces 13B (that is, side surfaces positioning to face the circumferential directions) and flange portions 13C having inner surfaces 13D.

The pole core 14 is fixed on the rotary shaft 10. Each of the plural permanent magnets 15 is located between two unguiform magnetic poles 13 that are mutually adjacent in the circumferential direction. Each permanent magnet 13 is magnetized to have magnetism to reduce leakage of the magnetic flux. Each of the magnet holding members 16 holds each permanent magnet 15 between two mutually-adjacent unguiform magnetic poles 13, so that each permanent magnet 15 is not only fixed but also protected from shocks or others. The cooling fan 15 is attached to both axial end surfaces of the pole core 14.

The pole core 14 will now be detailed further. The pole core 14 is formed to have a boss portion 21, a disk-like portion 22, and the foregoing unguiform magnetic poles 13, all portions of which are structured, for example, into one member. The boss portion 21 is linked with the rotary shaft 10. The disk-like portion 22 has a form that extends outwardly from the axial both ends of the boss portion 21 in the radial directions. Further, the unguiform magnetic poles 13 extend from the outermost radial ends of disk-like portion 22 along the axial directions in an engaged form. Thus two unguiform magnetic poles 13 which are mutually adjacent in the circumferential direction are located so that their circumferential-side surfaces 13B, which face the circumferential directions, as shown in FIG. 2, are opposed to each other. When the field current is supplied, one of two unguiform magnetic poles 13 which are mutually adjacent in the circumferential direction becomes magnetized in an N-pole, while the other in an S-pole, and magnetic flux is passed in the circumferential direction between the mutually faced circumferential-side surfaces 13S of the two adjacent unguiform magnetic poles 13.

Figure 3:
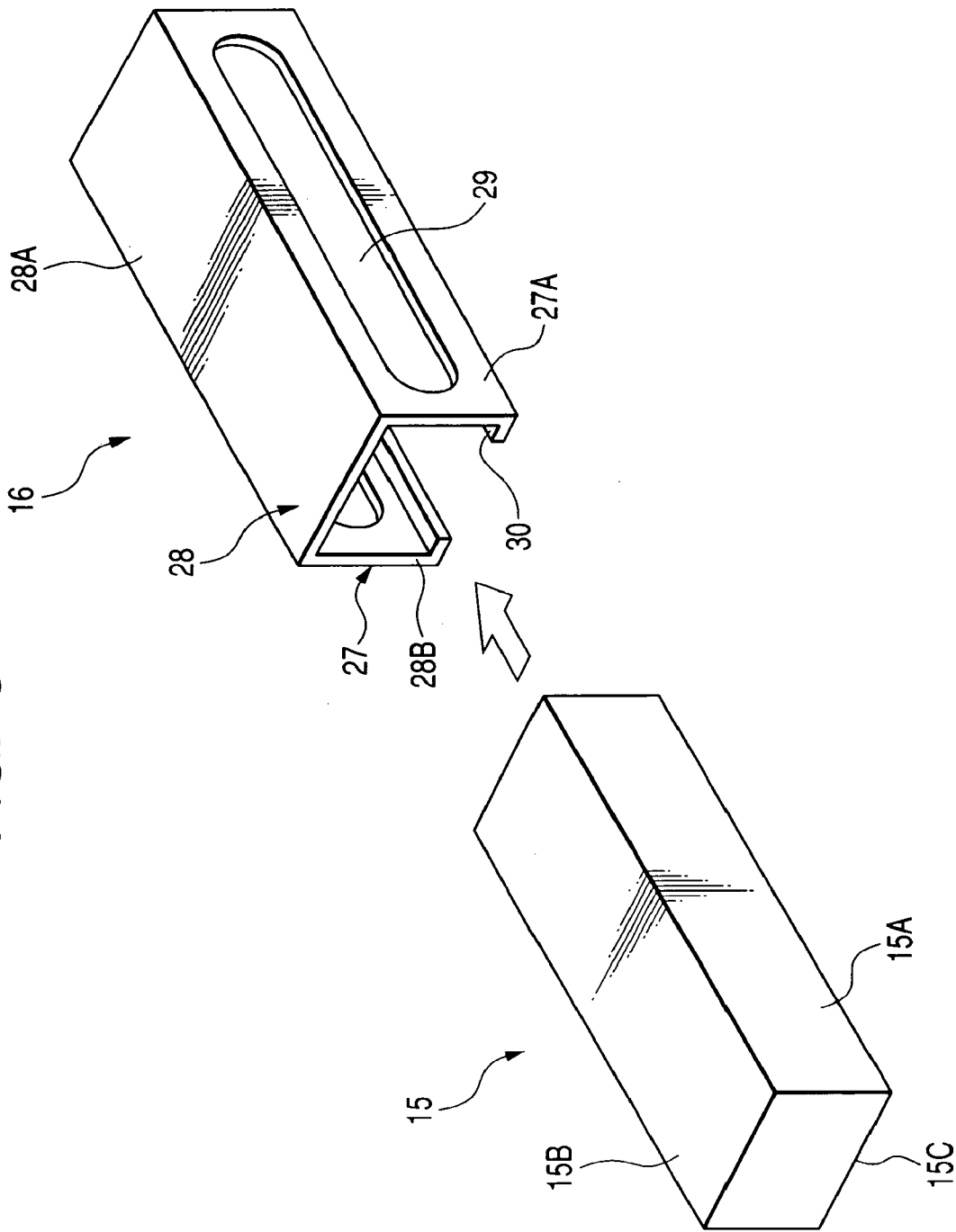
FIG. 3 is a perspective view showing one permanent magnet and one magnet holding member into which the permanent magnet is inserted.

The permanent magnets 15 are shaped into a substantially rectangular solid, as shown in FIG. 3, and made from rare earth materials such as neodymium. Each permanent magnet 15, which has a longitudinal direction, is placed in the rotor 3 so that the longitudinal direction agrees to the axial direction. Hence each permanent magnet 15 is oriented to have two circumferential-side surfaces 15A that face the circumferential direction, in which one of the two circumferential-side surfaces 15S serves as an N-pole surface and the other serves as an S-pole. Each permanent magnet 15 is disposed between two unguiform magnetic poles 13 such that its N-pole circumferential-side surface 15A is opposed to the circumferential-side surface 13B of one unguiform magnetic pole 13 to be magnetized in the N-pole and its S-pole circumferential-side surface 15A is opposed to the circumferential surface 13B of one unguiform magnetic pole 13 to be magnetized in the S-pole. Accordingly, it is possible that each permanent magnet 15 passes reliably magnet flux from the rotor 3 to the stator between mutually-adjacent N- and S-pole unguiform magnetic poles 13, with leakage of the magnetic flux reduced.

The magnet holding members 16 will now be detailed. As shown in FIG. 3, each magnet holding member 16 is formed into a rectangular box-like hollow frame member that has an approximately horseshoe shape when viewed in the axial direction and has an aperture at its radially lower surface (simply lower surface) and its circumferential-side surfaces. Hence each magnet holding member 16 is able to enclose at least both a radially upper surface (simply upper surface) 15B and both the circumferential-side surfaces 15A of each permanent magnet 15.

More concretely, each magnet holding member 16, made of non-magnetic metal such as stainless steel, is formed to have two side portions 27 covering both circumferential-side surfaces 15A and a bridge portion 28 covering the outer surface 15B and mutually bridging the two side portions 27. Each side portion 27 has a predetermined-size strip-like opening 29 formed therethrough in the circumferential direction, as illustrated in FIG. 3. Forming the openings 29 in the side portions 27 make it possible to lower rigidity of the side portions 27 than that of the bridge portion 28. In other words, the openings 29 make it possible to raise the side portions 27 in elasticity than the bridge portion 28.

Figure 4:
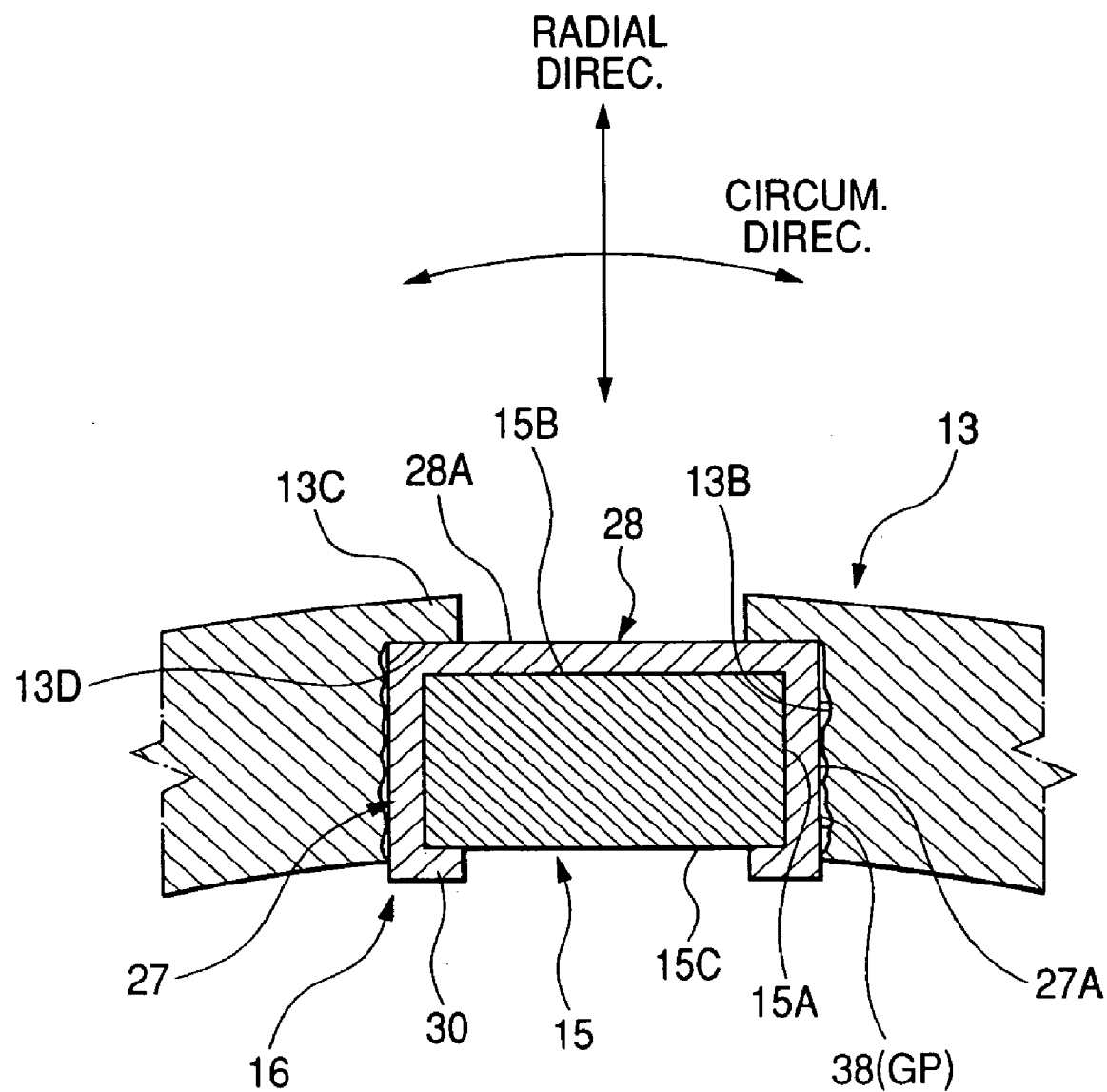
FIG. 4 is a cross sectional view showing a cross section of the magnet holding member with the magnet and mutually-adjacent two unguiform magnet poles between which the magnet holding member is fixedly disposed.

The two side portions 27 are bent at its bottoms inward to form strip-like ribs 30, as shown in FIG. 3, whereby the strip-like ribs 30 cover in part a radially lower surface (i.e., lower surface) 15C of each permanent magnet 15 (refer to FIG. 4).

Figure 5:
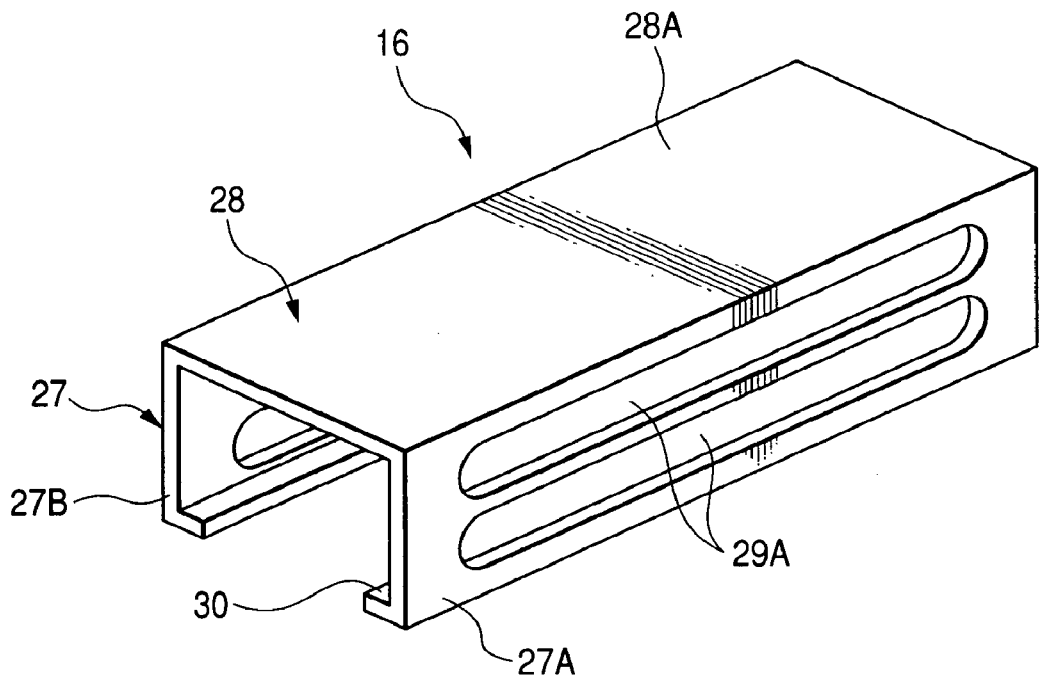
FIG. 5 is a perspective view showing a modification of the magnet holding member.
Figure 6:
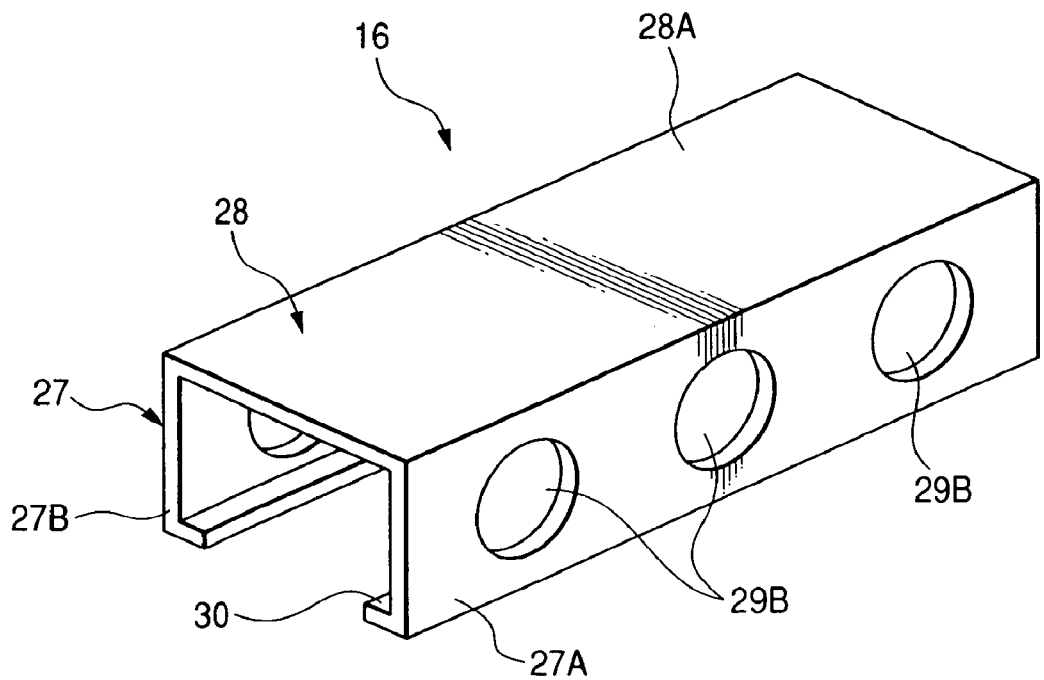
FIG. 6 is a perspective view showing another modification of the magnet holding member.

The openings 29 are shaped to elongate in the axial direction, as shown in FIG. 3. The opening 29 may be formed in each side portion 27 by only one, but this is not a definitive list. A further example is shown in FIG. 5, in which two strip-like openings 29A, which are the same in their shapes, may be formed in each side portion 27. Another example is shown in FIG. 6, three circular openings 29B, which are the same in their dimensions for instance, may be formed in each side portion 27. In these examples shown in FIGS. 5 and 6, the plural openings 29A (29B) formed in each side portion 27 may also be changed in their dimensions and shapes from one another. In this way, the number, shapes, and positions of one or more openings 29 may be arbitrary.

Figure 7:
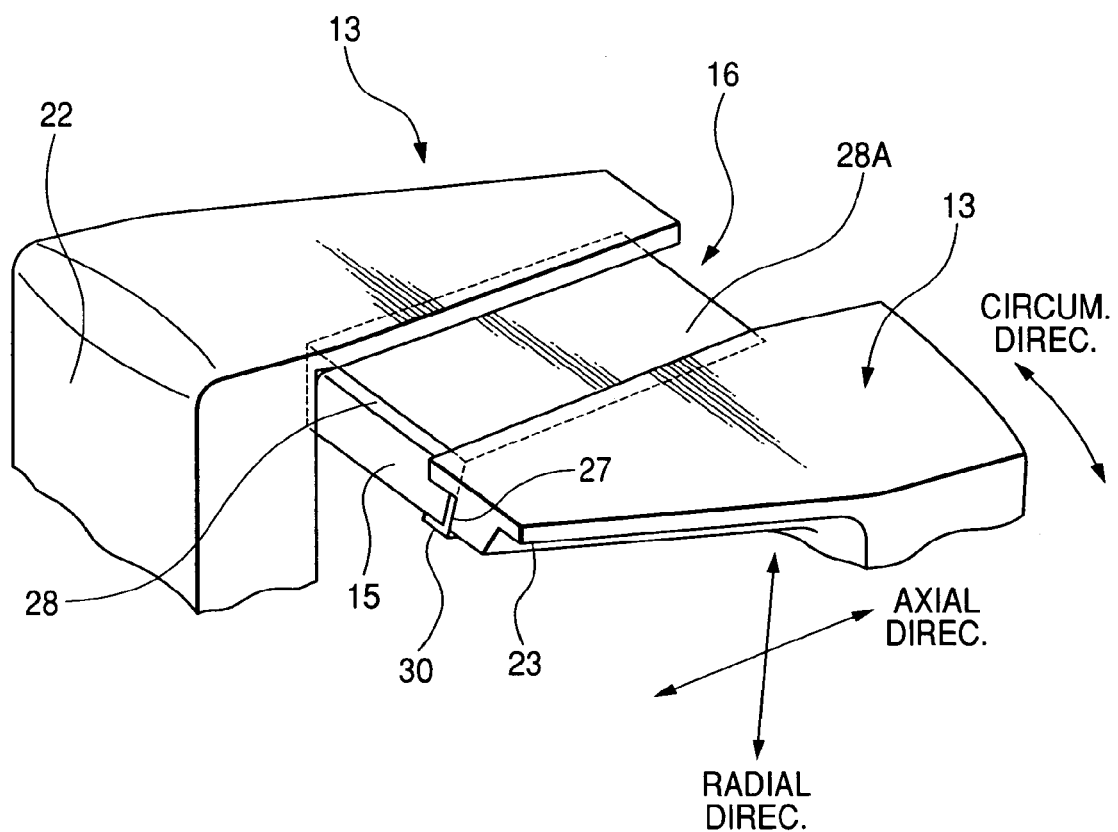
FIG. 7 is a partial perspective view explaining mutually-adjacent two unguiform magnet poles between which the magnet holding member with the magnet is fixedly disposed.

Each magnet holding member 16, which encloses each permanent magnet 15 in the circumferential direction, as shown in FIGS. 3 and 4, is disposed between two mutually-adjacent unguiform magnetic poles 13 so that its bridge portion 28 is located outside the magnet 15 in the radial direction, as shown in FIG. 7. In this disposal state, each magnet holding member 16 is restrained in both of the circumferential, axial and radial directions.

To be specific, each of outer surfaces 27A of the two side portions 27 is made to touch each of the circumferential-side surfaces 13B of the two mutually-adjacent unguiform magnetic poles 13, whereby the magnet holding member 16 is restrained in the circumferential direction (refer to FIG. 4).

Both axial ends 27B of each magnet holding member 16 are respectively made to touch axial inner surfaces 22A (refer to FIG. 2) of the two mutually-adjacent disk-like portions 22, so that the member 16 is restrained in the axial direction as well. Further, the bridge portion 28 has an outer surface 28A, which is made to touch the inner surfaces 13D of the flange portions 13C of two mutually-adjacent unguiform magnetic poles 13 (refer to FIGS. 2 and 7). Hence each magnet holding member 16 is fixed and restrained from moving in the radial direction. Each permanent magnet 15 enclosed by the magnet holding member 16 can therefore be prevented from dropping off outwardly in the radial direction even when the centrifugal force acts on the member 16.

By the way, to save manufacturing cost, the pole core 14 is often manufactured with forging. When the forging is used in manufacturing pole core 14, the surfaces including the circumferential-side surfaces 13B are obliged to be rougher than the surfaces of the magnet holding members 16. Thus, partial touches are made between the outer surfaces 27A of the side portions 27 of the magnet holding members 16 and the circumferential-side surfaces 13B of the unguiform magnetic poles 13. That is, there are formed "uneven gaps GP between each magnetic pole and juxtaposed holding members." To disable the uneven gaps GP, the present embodiment employs a technique of filling the uneven gaps GP with thermosetting resin so that a thermosetting resin layer 38 is formed between the outer surfaces 27A and the circumferential-side surfaces 13B, as shown in FIG. 4. The material for the thermosetting resin layer 38 may be, for example, a resin that is the same as impregnated resin for fixing and protecting the magnetic field coil 12.

There is provided a manufacturing method for heat setting the impregnated resin layers for fixing and protecting the magnetic field coil 12 and for fling in the uneven gaps GP. When the generator 1 is manufactured, a thermoplastic resin (pre-polymer) which is before being hot-cured is coated on the magnetic field coil 12 to form a Mm thereon, while a thermosetting resin (pre-polymer) is applied to the uneven gaps GP between each magnetic pole and juxtaposed holding members. After these processes, both of the resin layers on the coil 12 and in the uneven gaps GP are subjected to heat setting all together. Hence the impregnating and fixing process for the coil 12 is performed in parallel with the fixing process for the uneven gaps GP, thus raising working efficiency.

The entire operations and advantages of the generator 1 will now be described.

With the rotor 3 driven to rotate by the internal combustion engine, field current is supplied to the magnetic field coil 12 so that the unguiform magnetic poles 13 are magnetized. This magnetization enables the armature coils 5 of the stator 2 to induce AC current therethrough. The induced AC current is then subjected to rectification at the rectifier 6, with the result that the AC current is converted to DC (direct current) current. This DC current is provided to the on-vehicle battery and others.

During the above operations with regard to the power generation, each of the permanent magnets 15, which are located between two adjacent unguiform magnetic poles 13, operates to surely pass the magnetic flux from one pole 13 to the other pole 13 in a condition that leakage of magnetic flux is reduced or prevented.

Though the rotation of the rotor 3 causes the centrifugal force to be exerted on the permanent magnets 15 and others, the magnets 15 will be safe. The reason is that each magnet 15 is surrounded by each magnet holding member 16 in the almost horseshoe shape in the circumferential direction and each magnet holding member 16 is stopped by two unguiform magnetic poles 13 in the radial direction. Accordingly the magnets 19 are, with steadiness, prevented from dropping off due to the centrifugal force and are protected from shocks or other disturbances.

The advantages of the magnet holding members 16 according to the present embodiment will now explained in more detail.

As described, each magnet holding member 16, which has predetermined dimensions and a shape, has the two side portions 27 made to touch the two circumferential-side surfaces 15A of each magnet 15 and the bridge portion 28 made to touch the outer surface 15B of the magnet 15 and formed to bridge both the side portions 27. In his structure, the two side portions 27 are lower in rigidity than the bridge portion 28. On the contrary, the two side portions 27 are higher in elasticity than the bridge portion 28 by a predetermined amount of elasticity.

Thus, the magnet holding members 16 can be shaped into a substantially horseshoe shape when viewed along the axial direction, so that, compared to the structure in which each holding member encloses entirely each permanent holding member 15, an amount of material used in manufacturing the holding members 16 can be reduced. Furthermore, since the rigidity of both the two side portions 27 is less than that of the bridge portion 28, a plate-like member can easily be formed into each holding member 16 having a substantially horseshoe-like side view. As a result, the holding members 16 can be suppressed or avoided from increasing in their manufacturing cost, while still holding the respective magnets 15 without their breakages.

Furthermore, as described, for the purpose of reducing manufacturing cost of the generator 1, it is often inevitable that the surfaces of the pole core 14 are rougher. When such rough surfaces should be accepted, it is undesirable to have direct contact between the magnetic holding members 16 and the pole core 14. That is, if the circumferential-side surfaces 15S of each permanent magnet 15 are made to touch the surfaces of the pole core 14 (in the present embodiment, the circumferential-side surfaces 13B of the unguiform magnetic poles 13) in a direct manner, the contacts between the surfaces 15A and 13B produce local portions that are subjected to stronger stress than other portions. This uneven stress may give rise to breakages of the permanent magnets 15.

However, the generator 1 according to the present invention employs the lower-rigidity side potions 27, which enclose the circumferential-side surfaces 15A of each magnet 15. Thus the circumferential-side surfaces 15A of each magnet 15 can be avoided from directly contacting the surfaces of the pole core 14. The lower-rigidity side portions 27 are also effective for absorbing locally stressing forces. Therefore, it is advantageous to lower the probability of damaging or cracking permanent magnets 15 due to excessive shocks or vibrations.

In addition, the two side portions 27 of each magnet holding member 16 are formed to have the openings 29, which are able to weaken their rigidity than that of the bridge portion 28. The openings 29, which are opened in the circumferential direction, can be formed by means such as pressing, which are relatively easier. Hence the lower rigidity of the side portions 27 can be realized with ease.

Both strip-like lower ends (i.e., strip-like ribs 30) of both the side portions 27 of each magnet holding member 16 are bent to touch the inner surface 15C of the magnet 15. This bent rib structure prevents the permanent magnets 15 from coming off inward.

The magnet holding members 16 are made of non-magnetic metals. If rustproof non-magnetic metals are adopted as materials for the magnet holding members 16, the members 16 can be avoided from damaged on account of rust. This is also helpful in suppressing the permanent magnets 15 from rusting, whereby it is unnecessary to apply expensive surface treatment, such as plating, to the permanent magnets 15, thus reducing manufacturing cost.

Furthermore, in the present generator 1, the thermosetting resin layer 38 is filled in the "uneven gaps GP between each magnetic pole and juxtaposed holding members. This strengthens the connection between each magnet holding member 16 and each unguiform magnetic pole 13, thus enabling each magnet 15 to be held firmly between two unguiform magnetic poles 13.

The above thermosetting resin layer 38 is the same in resin material type as the impregnated fixed resin to protect the magnetic field coil 12. Hence the impregnating and fixing process for the coil 12 can be done together with the fixing process for the layer 38 filled in the uneven gaps GP. It is therefore possible to reduce the number of working processes, reducing manufacturing cost.

Use of the thermosetting resin layer 38 yields an additional advantage, which is resultant from the fact that the resin (layer) 38 comes into the openings 29 in both side portions 27. This causes the magnet holding members 16, permanent magnets 15, and unguiform magnetic poles 13 to be tightened more with each other.

For manufacturing the generator 1, both the impregnated fixed resin (pre-polymer) film formed on the magnetic field coil 12 and impregnated fixed resin (pre-polymer) filled in the gaps between the magnetic poles and the other surrounding members may be subjected to heating at the same time. In this case, prior to forming the rotor 3 into which the magnetic filed coil 12, pole core 14, permanent magnets 15, magnet holding members 16, and others are assembled in position, a film of the pre-polymer can be formed on the field coil 12. The rotor 3 is then assembled, before being subjected to heating as a whole. This heating allows the impregnated fixed process for the magnetic field coil 12 and the fixed process within the uneven gaps GP between the poles and the other surround members in a parallel manner. This way of manufacturing method facilitates the working processes to a considerable degree, compared to the case in which the rotor 3 is assembled before the pre-polymer is applied the magnetic field coil 12.

The foregoing structure of the generator 1 can be reduced into practice in other modified forms, which will now be described thereinafter.

(First Modification)

Figure 8:
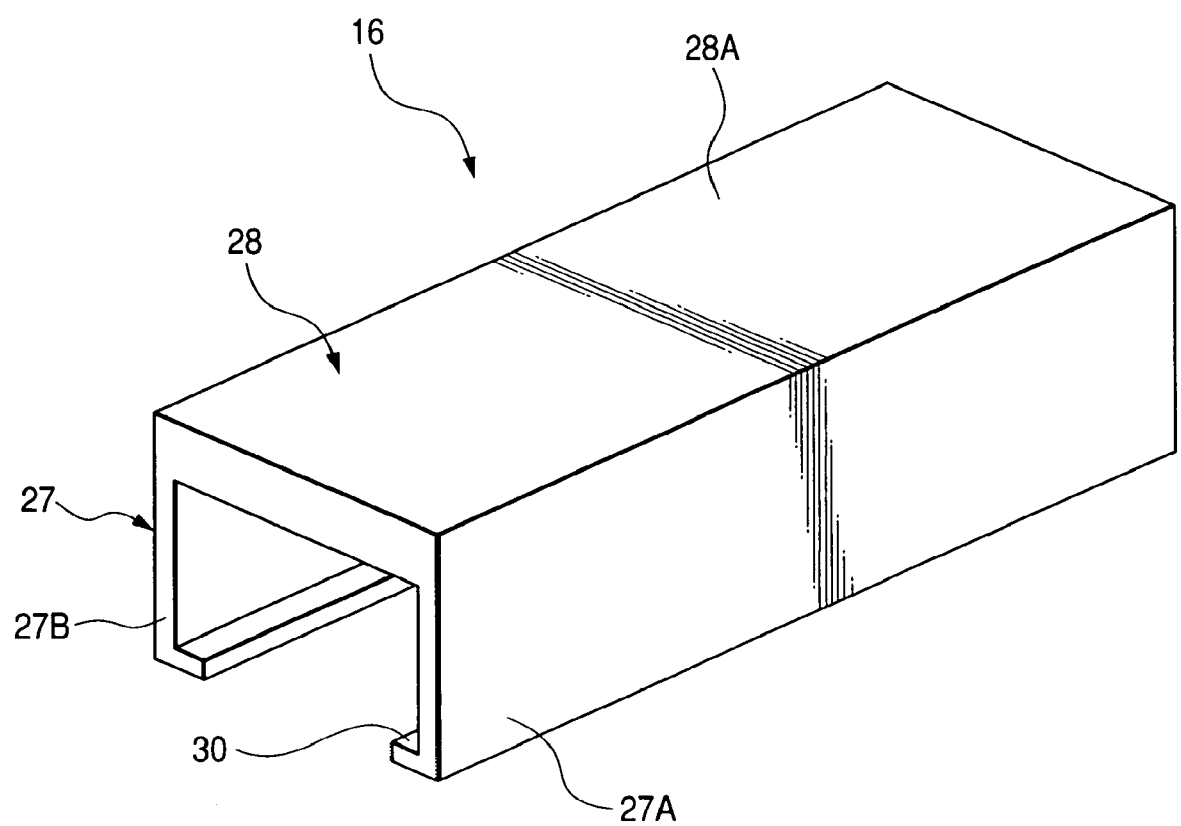
FIG. 8 shows, in its perspective view, another modification of a magnet holding member.

A first modification is illustrated in FIG. 8, which is concerned with a modified structure of one of the magnet holding member 16. The components other than the magnet holding member 16 are the same or similar to those in the foregoing embodiment.

The magnet holding member 16 according to this modification has side portions 27 whose thicknesses are actively smaller than that of the bridge portion 28 by a predetermined amount. Hence the rigidity of the side portions 27 can be lowered than that of the bridge portion 28. When taking the converse point of view, the side portions 27 can be higher in elasticity than the bridge portion 28. The predetermined amount of thickness, which is reduced from the side portions 27, is dependent on how much the rigidity is reduced than the bridge portion 28.

Accordingly, the foregoing embodiment provides the same or similar advantages to those, gained in the foregoing embodiment.

(Second Modification)

Figure 9:
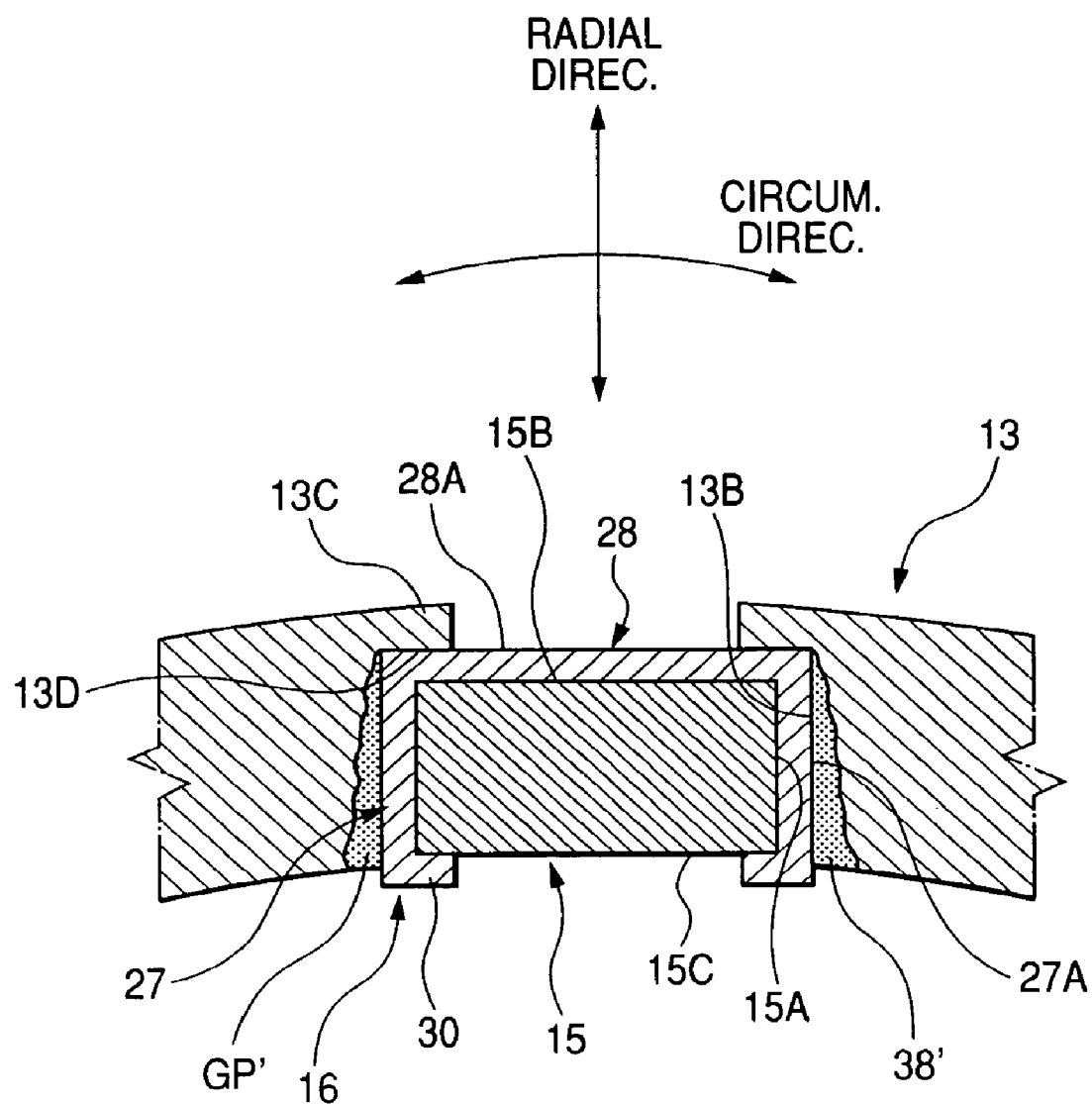
FIGS. 9 and 10 are partial cross sectional views according to modified examples of disposal of the magnet holding member between mutually-adjacent two unguiform magnetic poles.

A second modification is illustrated in FIG. 9, which is concerned with a modified structure of gaps GP' formed the magnet holding member 16 and the two unguiform magnetic poles 13 which are mutually adjacent.

That is, as shown in FIG. 9, the circumferential-side surfaces 13B of each unguiform magnetic pole 13 have a substantial tilt to each of the outer surfaces 27A of the side portions 27 of the magnet holding member 16 in such a manner that a gap formed between each outer surface 27A and each circumferential-side surface 13B increases in its circumferential distance as the radial position goes down inward. Hence as shown in FIG. 9, the gap GP' is formed in a wedge shape in the axial direction.

Like the foregoing embodiment, the wedged-shaped gaps GP' are filled with thermosetting resin so as to form wedged-shaped resin layers 38' on both circumferential sides of the magnet holding member 16, as shown in FIG. 9. This wedged-shaped resin layers 38' serve as wedges toward both the permanent magnet 15 and the magnet holding member 16, on which the centrifugal force acts. Accordingly, the permanent magnet 15 can be supported more firmly between mutually-adjacent unguiform magnetic poles with the use of the magnet holding member 16 on which the wedged-shaped layers 38' acts. This is also helpful in preventing the magnet holding member 16 and magnet 15 from being damaged due to the centrifugal force, vibration and others.

(Third Modification)

Figure 10:
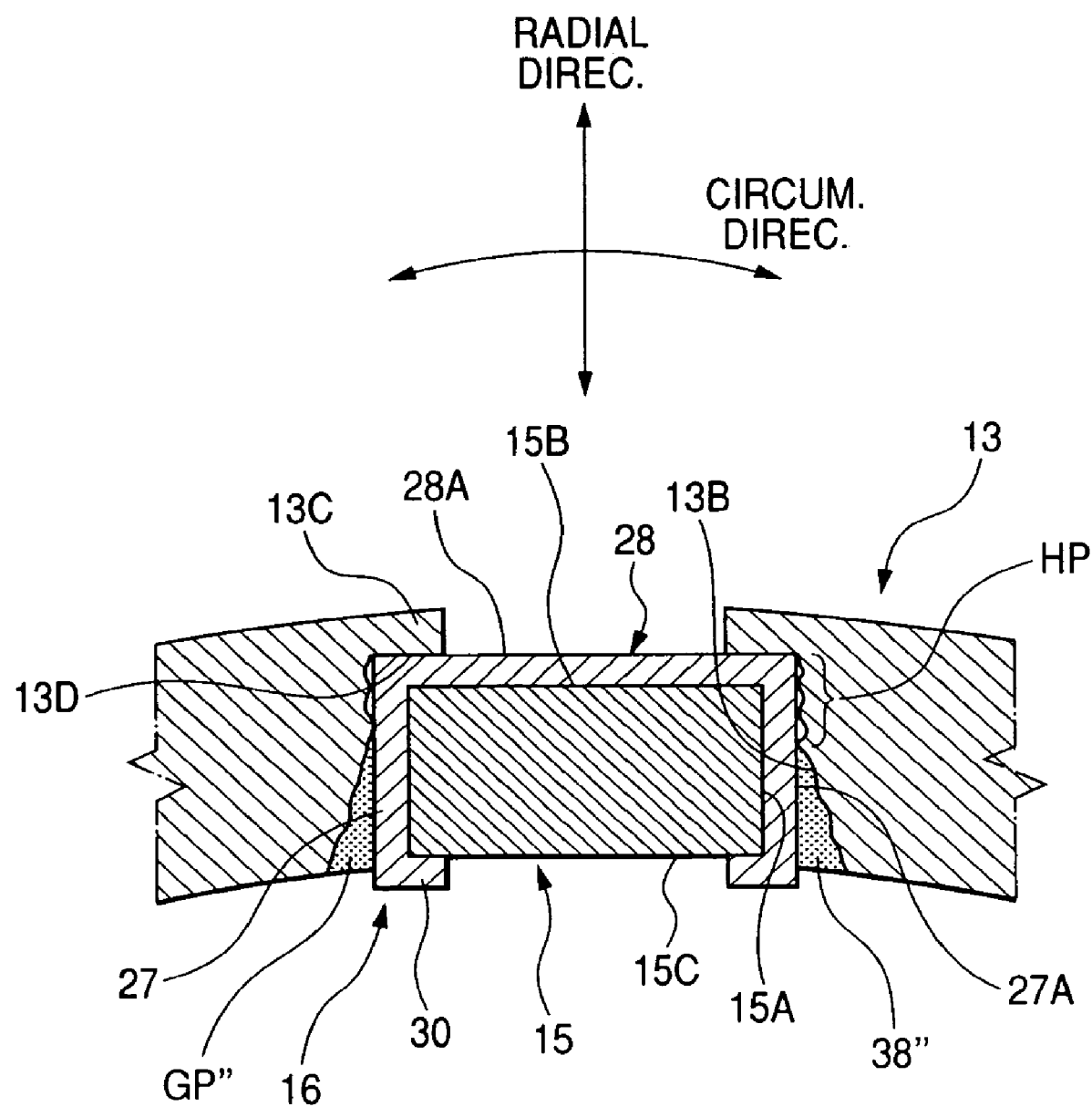

A third modification is illustrated in FIG. 10, which is also concerned with a modified structure of gaps GP' formed the magnet holding member 16 and the two unguiform magnetic poles 13 which are mutually adjacent.

The gaps GP'' is structured as a variation of the second modification, in which the gaps GP'' are similar to the forgoing one GP', but different in that each gap GP'' is shorter in the radial length than the foregoing gap GP'. Hence, each of the circumferential-side surfaces 13B has a holding portion HP that holds each of the outer surfaces 27 of the magnet holding member 16 by touching it almost tightly. The holding portions HP locate near to the bridge portion 28 of the holding member 16 and restrain the holding member 16 at the top position thereof. Each of the gaps GP' still maintains a wedge shape in section and is also filled with the thermosetting resin so as to form a wedged-shaped resin layers 38'' whose thickness becomes gradually larger as going down inward in the radial direction.

Hence, in the present modification, thanks to both of holding effects given by the holding portions SP and wedging effects given by the wedged-shaped resin layers 38'', the permanent magnet 15 and magnet holding member 16 can be held between mutually-adjacent unguiform magnetic poles 13 in a steadier manner.

The present invention may be embodied in several other forms without departing from the spirit thereof. The embodiments and modifications described so far are therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. An on-vehicle rotary electric machine, comprising:
    a rotary shaft driven to rotate, the shaft having a longitudinal axis defining an axial direction, radii defining a radial direction, and a circumference defining a circumferential direction;
    a pole core secured on the rotary shaft;
    a plurality of magnetic poles formed as parts of the pole core, the magnetic poles being located at intervals in the circumferential direction, passing magnetic flux between two mutually-adjacent magnetic poles, and each having an axial inner surface directed inward in the axial direction;
    a plurality of permanent magnets each intervening between the two mutually-adjacent magnetic poles, each magnet being magnetized to reduce leakage of the magnetic flux to be passed; and
    a plurality of holding members each holding therein each permanent magnet between the two mutually-adjacent magnetic poles, each holding member being formed as a rectangular box-shaped hollow frame member and being secured between the two mutually-adjacent magnetic poles and each holding member having:
        a first plate portion enclosing a radially outer surface of each permanent magnet in the axial direction and being located in each circumferential interval between two mutually-adjacent magnetic poles of the magnetic poles so that the first plate portion is partially exposed in the radial direction, and
        two second plate portions respectively being located to face an axial side surface of each of the magnetic poles in the circumferential direction and enclosing both axial side surfaces of each permanent magnet in the circumferential direction, the two second plate portions being rigidly coupled to the first plate portion, and radial ends of the second plate portions being bent to partly enclose a radially inner surface of the permanent magnet, wherein
    the first and the second plate portions form axial ends each being located on both axial sides of the first and the second plate portions, the axial ends being open ends, both open ends allowing each permanent magnet held in each holding member to be exposed in the axial direction and each of both open ends facing the axial inner surface of each of the two mutually-adjacent magnetic poles on both axial sides of each holding member, and the two second plate portions each have an opening formed therethrough in the circumferential direction, the opening weakening each of the second plate portions in rigidity so that each of the two second plate portions is lower in rigidity than the first plate portion;
    the magnetic poles are composed of a plurality of unguiform pieces through which magnetic flux passes, the plurality of unguiform pieces protrude from the pole core in the axial direction;
    the holding member is secured between two of the mutually-adjacent unguiform pieces by at least partially touching an outer surface of each of the second plate portions of the holding member to each side surface of each of the mutually-adjacent unguiform pieces, and
    a thermosetting resin is filled in a gap between the outer surface of each of the second plate portions of the holding member and each side surface of each of the unguiform pieces, the gap having a width in the circumferential direction and the width increasing as the gap goes down radially inward.

2. The on-vehicle rotary electric machine according to claim 1, wherein the machine is an alternating-current generator mounted on a vehicle, the rotary shaft is driven by an internal combustion engine mounted on the generator, and the pole core is included in a rotor facing a stator with a gap therebetween.

3. The on-vehicle rotary electric machine according to claim 1, wherein both open ends allowing each permanent magnet to be exposed in the axial direction are a substantially horseshoe-shaped open ends when viewed in the axial direction.

4. The on-vehicle rotary electric machine according to claim 1, wherein the magnetic poles are a plurality of tapered pieces through which magnetic flux passes, the plurality of tapered pieces protrude from the pole core in the axial direction.

5. The on-vehicle rotary electric machine according to claim 1, wherein a magnetic field coil is loaded to the pole core and the thermosetting resin is the same in material type as a resin material to be impregnated and fixed to protect the magnetic coil.

6. The on-vehicle rotary electric machine according to claim 1, wherein the two second plate portions are thinner than the first plate portion.

7. The on-vehicle rotary electric machine according to claim 1, wherein the holding member is made of a non-magnetic material.

8. The on-vehicle rotary electric machine according to claim 1, wherein the opening is one in number.

9. The on-vehicle rotary electric machine according to claim 1, wherein the opening is two or more in number.

* * * * *